United States Patent
Honjo et al.

(10) Patent No.: US 7,481,358 B2
(45) Date of Patent: Jan. 27, 2009

(54) COMMUNICATION SYSTEM, CARD, MANAGEMENT SERVER, COMMUNICATION METHOD, PROGRAM, AND RECORD MEDIUM HAVING RECORDED THEREON PROGRAM

(75) Inventors: Akira Honjo, Tokyo (JP); Takeshi Ootsuka, Kanagawa (JP)

(73) Assignee: Sony Corporation, Tokyo (JP)

( * ) Notice: Subject to any disclaimer, the term of this patent is extended or adjusted under 35 U.S.C. 154(b) by 1141 days.

(21) Appl. No.: 10/468,746

(22) PCT Filed: Feb. 22, 2002

(86) PCT No.: PCT/JP02/01595

§ 371 (c)(1),
(2), (4) Date: Mar. 2, 2004

(87) PCT Pub. No.: WO02/067169

PCT Pub. Date: Aug. 29, 2002

(65) Prior Publication Data
US 2004/0133510 A1  Jul. 8, 2004

(30) Foreign Application Priority Data
Feb. 23, 2001  (JP) .............................. 2001-049135

(51) Int. Cl.
*G06F 17/00* (2006.01)
(52) U.S. Cl. ......................... 235/375; 235/492; 235/451
(58) Field of Classification Search ................. 235/492, 235/375, 451
See application file for complete search history.

(56) References Cited

U.S. PATENT DOCUMENTS

| 5,563,396 A | * | 10/1996 | Wakui | 235/441 |
| 5,635,695 A | * | 6/1997 | Feiken | 235/380 |
| 6,523,754 B2 | * | 2/2003 | Hoshino et al. | 235/492 |
| 6,722,572 B2 | * | 4/2004 | Ono et al. | 235/492 |

FOREIGN PATENT DOCUMENTS

| JP | 6-311069 | 11/1994 |
| JP | 9-179947 | 7/1997 |
| JP | 10-143589 | 5/1998 |
| JP | 10-240840 | 9/1998 |
| JP | 2000-20619 | 1/2000 |
| JP | 2000-66928 | 3/2000 |
| JP | 2001-5928 | 1/2001 |

* cited by examiner

*Primary Examiner*—Ahshik Kim
(74) *Attorney, Agent, or Firm*—Bell, Boyd & Lloyd LLP

(57) ABSTRACT

In a communication method for enabling communication between a card and a management server that manages the card and for writing information transmitted from the management server to the card, a server state flag and a card state flag are created to indicate the processing state of the management server and the processing state of the card, respectively. The server state flag and the card state flag are occasionally updated during communication between the card and the management server. On the basis of the card state flag, it is determined whether or not the writing by the management server to the card is completed normally. When the writing is not completed normally, the card is rewritten the next time communication is established between the card and the management server, the rewriting being defined in accordance with the card state flag and the server state flag.

17 Claims, 14 Drawing Sheets

FIG. 11

| CARD | SERVER | REWRITING | PAYMENT |
|---|---|---|---|
| 0 | 1 | NONE | PAYMENT UNSETTLED |
| 1 | 1 | ADD PAYMENT VALUE TO CARD<br>CARD: 1→0 | PAYMENT UNSETTLED |
| 1 | 3 | CARD: 1→0 | PAYMENT SETTLED |
| 0 | 3 | NONE | PAYMENT SETTLED |

FIG. 14

| CARD | SERVER | REWRITING | WITHDRAWAL |
|---|---|---|---|
| 0 | 1 | NONE | NOT MADE |
| 1 | 1 | CARD: 1→0 | NOT MADE |
| 1 | 2 | CARD: 1→0 | NOT MADE |
| 1 | 3 | ADD WITHDRAWN VALUE TO CARD<br>CARD: 1→0 | MADE |
| 1 | 4 | ADD WITHDRAWN VALUE TO CARD<br>CARD: 1→0 | MADE |
| 0 | 4 | NONE | MADE |

COMMUNICATION SYSTEM, CARD, MANAGEMENT SERVER, COMMUNICATION METHOD, PROGRAM, AND RECORD MEDIUM HAVING RECORDED THEREON PROGRAM

The present invention relates to communication systems for performing payment settlement processing using cards via networks, to cards, to management servers, and to communication methods. In the present specification and drawings, a monetary value stored on a card is referred to as a value. A process of writing various information including a value to a card is referred to as a card writing process.

BACKGROUND OF THE INVENTION

Recently, attempts have been made to perform electronic commerce (e-commerce) transactions using IC (Integrated Circuit) cards via networks. Since an IC has a data-writable (rewritable) memory, a single IC card is repeatedly used. Using this characteristic, a value is stored on an IC card. By rewriting the value, the IC card is used as electronic money for settling a payment for a commerce transaction.

Compared with known magnetic cards, IC cards are more failure-resilient and store greater amount of information. Such IC cards are thus used in online e-commerce transactions and widely used offline in place of ID cards or pass permits. In view of such circumstances, contactless IC cards have been used to save labor involving taking an IC card out of a card holding case. Contactless IC cards each have embedded therein transmitting/receiving means (antenna) for transmitting and receiving data wirelessly using electromagnetic waves or the like. By holding the IC card near a dedicated card reader, data is transferred without establishing a physical contact between the IC card and the card reader.

When conducting an e-commerce transaction via a network using an IC card, it is very important to match a value on the IC card with a value at a management server that manages the value on the IC card. Since the values are exchanged between the IC card and the management server via a network that does not ensure establishment of a connection, a card writing process may be interrupted, resulting in a mismatch of values. In particular, in the case of a contactless IC card, establishment of a connection is not ensured between the IC card and the network. As a result, the card writing process may be interrupted easily.

In response to the problems, there is a card writing process sequence that assumes that the card writing process will be interrupted. In the process sequence, when writing a value to an IC card, a flag value is provided indicating whether or not the writing to the IC card has been completed normally. The flag value is stored in the management server or the IC card. Determination of the flag value enables determination of whether or not the writing has been completed normally.

The above-described known technique for determining whether or not the writing to the IC card has been completed normally on the basis of the flag value has the following problems:

(1) In a case in which simultaneous accesses involving writing the value and changing the flag value are not ensured by the IC card, if a card addition/subtraction process occurs offline before the subsequent communication is established between the IC card and the management server, the value on the IC card is changed. Therefore, there is no method for determining whether or not the card writing process has been completed normally.

(2) Since there is no method to deal with a mismatch of values between the IC card and the management server, it is difficult to make a payment settlement via the Internet using a contactless IC card.

(3) When the card writing process is interrupted, the IC card user must communicate with the management server to detect the processing result.

In view of the foregoing problems, in a case in which the value on the IC card does not match the value at the management server, when the IC card is used offline, a value that is not supposed to exist in reality may be available for use or a value that is supposed to exist may not be available for use, resulting in inconvenience in which a desired commerce transaction cannot be conducted.

In view of the foregoing problems of a communication method for enabling communication between a known card (IC card) and a management server therefor, it is an object of the present invention to provide a new and improved communication system, card, management server, and communication method for matching a value on a card with a value at a management server therefor even when a card writing process (value subtraction/addition process) is performed online.

SUMMARY OF THE INVENTION

In order to solve the foregoing problems, a communication system of the present invention is a communication system for enabling communication between a card and a management server that manages the card and for writing information transmitted from the management server to the card. The card creates a card state flag indicating the processing state of the card and occasionally updates the card state flag while communicating with the management server. The management server creates a server state flag indicating the processing state of the management server and occasionally updates the server state flag while communicating with the card. On the basis of the card state flag, the card determines whether or not the writing by the management server to the card is completed normally. When it is determined that the writing is not completed normally, the card requests the management server to rewrite the card the next time communication is established between the card and the management server, the rewriting being defined in accordance with the card state flag and the server state flag.

Another communication system of the present invention is a communication system for enabling communication between a card and a management server that manages the card and for writing information transmitted from the management server to the card. The card creates a card state flag indicating the processing state of the card and occasionally updates the card state flag while communicating with the management server. The management server creates a server state flag indicating the processing state of the management server and occasionally updates the server state flag while communicating with the card. On the basis of the card state flag, the management server determines whether or not the writing by the management server to the card is completed normally. When it is determined that the writing is not completed normally, the management server rewrites the card the next time communication is established between the card and the management server, the rewriting being defined in accordance with the card state flag and the server state flag.

According to the communication system, the card creates the card state flag indicating the processing state of the card. While communicating with the management server, the card occasionally updates the card state flag. Determination of the card state flag enables determination of whether or not the writing by the management server to the card is completed normally. Since it is possible to determine whether or not the card writing is completed normally only on the basis of the card state flag, the card need not communicate with the management server to detect the processing result.

At the same time, the management server creates the server state flag indicating the processing state of the management server. While communicating with the card, the management server occasionally updates the server state flag. With simultaneous processing by the card and the management server, a value on the card is matched with a value at the management server. Using the card, a payment is easily settled via a network.

In the communication system of the present invention, preferably the information is written in predetermined block units in a storage region in the card in which the information is written. A single write request from the management server may enable the writing of the information in a plurality of the block units.

In the communication system of the present invention, preferably the information includes information concerning a monetary value for making a payment for a product or a service using the card.

In the communication system of the present invention, preferably the card state flag is 1-bit data indicating whether or not the writing to the card is completed normally.

In the communication system of the present invention, preferably the card includes communication means for communicating with the management server; first storage means for storing the information; second storage means for storing the card state flag; and processing means for performing various processes in accordance with predetermined information and a request.

In the communication system of the present invention, preferably the card further includes third storage means for storing a card operating system. The processing means may perform various processes in accordance with predetermined information and a request using the operating system.

In the communication system of the present invention, preferably the card is an IC card.

In order to solve the foregoing problems, a card of the present invention is a card for communicating with a management server that manages the card, to which information transmitted from the management server is written. The card includes communication means for communicating with the management server; first storage means for storing the information; second storage means for storing the processing state of the card communicating with the management server as a card state flag; and processing means for performing various processes in accordance with predetermined information and a request. The card state flag in the second storage means is occasionally updated while the information is being written into the first storage means.

According to the card, the card includes the communication means for communicating with the management server. The card stores the information transmitted from the management server and maintains the processing state of the card as the card state flag. During the writing of the information, the card state flag is occasionally updated. Determination of the card state flag enables determination of whether or not the writing by the management server to the card is completed normally. Since it is possible to determine whether or not the card writing is completed normally only on the basis of the card state flag, the card need not communicate with the management server to detect the processing result. When the card writing is not completed normally, it is preferable to prompt a user of the card to be aware of the necessity to rewrite the card.

The next time communication is established between the card and the management server, the rewriting is performed immediately. The value on the card is thus matched with the value at the management server.

Preferably, on the basis of the card state flag, the card of the present invention determines whether or not the writing by the management server to the card is completed normally. When it is determined that the writing is not completed normally, the card may request the management server to rewrite the card the next time communication is established between the card and the management server.

In the card of the present invention, preferably the information is written into the first storage means in predetermined block units. A single write request from the management server may enable the writing of the information in a plurality of the block units.

In the card of the present invention, preferably the information includes information concerning a monetary value for making a payment for a product or a service using the card.

In the card of the present invention, preferably the card state flag is 1-bit data indicating whether or not the writing to the card is completed normally.

Preferably, the card of the present invention further includes third storage means for storing a card operating system. The processing means may perform various processes in accordance with predetermined information and a request using the operating system.

Preferably, the card of the present invention is an IC card.

In order to solve the foregoing problems, a management server of the present invention is a management server for managing a card and for transmitting information to the card. The management server includes communication means for communicating with the card; first storage means for storing the content of the information stored on the card; second storage means for maintaining the processing state as a server state flag; and third storage means for temporarily storing the information when the state of the card is determined and it is thus determined that the writing of the information is not completed normally. The server state flag in the second storage means is occasionally updated while the information is being transmitted to the card.

According to the management server, the management server includes the communication means for communicating with the card. The management server transmits the information to the card and maintains the processing state of the management server as the server state flag. During communication with the card, the server state flag is occasionally updated. Even if communication with the card is interrupted, the state of the management server at the time of the interruption of the communication can be determined. By temporarily storing the information at the time of the interruption of the communication, the information can be rewritten to the card. A value on the card is thus matched with a value at the management server.

According to the present invention, a program for causing a computer to function as the above-described management server and a computer-readable recording medium having recorded thereon such a program are provided.

In the management server of the present invention, preferably, when the writing of the information is not completed normally, the information stored in the third storage means is retransmitted to the card.

In the management server of the present invention, preferably, when the writing of the information is not completed normally, in response to a request from the card, the information stored in the third storage means is retransmitted to the card.

In the management server of the present invention, preferably the information includes information concerning a monetary value for making a payment for a product or a service using the card.

In order to solve the foregoing problems, a communication method of the present invention is a communication method for enabling communication between a card and a management server that manages the card and for writing information transmitted from the management server to the card. The communication method includes creating the processing state of the management server and the processing state of the card as a server state flag and a card state flag, respectively; occasionally updating the server state flag and the card state flag while communication is performed between the card and the management server; determining, on the basis of the card state flag, whether or not the writing by the management server to the card is completed normally; and, when it is determined that the writing is not completed normally, rewriting the card the next time communication is established between the card and the management server, the rewriting being defined in accordance with the card state flag and the server state flag.

According to the communication method, the card creates the card state flag indicating the processing state of the card. While communicating with the management server, the card occasionally updates the card state flag. Determination of the card state flag enables determination of whether or not the writing by the management server to the card is completed normally. Since it is possible to determine whether or not the card writing is completed normally only on the basis of the card state flag, the card need not communicate with the management server to detect the processing result.

At the same time, the management server creates the server state flag indicating the processing state of the management server. While communicating with the card, the management server occasionally updates the server state flag. With simultaneous processing by the card and the management server, a value on the card is matched with a value at the management server. Using the card, a payment is easily settled via a network.

In the communication method of the present invention, preferably the card state flag is 1-bit data indicating whether or not the writing to the card is completed normally.

BRIEF DESCRIPTION OF THE DRAWINGS

FIG. 4A is an illustration of the internal structure of the card, and FIG. 4B is a block diagram of an IC module.

FIG. 11 is an illustration of a rewriting process when the sequence of the subtraction process is interrupted.

FIG. 14 is an illustration showing a rewriting process when the sequence of the addition process is interrupted.

DETAILED DESCRIPTION OF THE INVENTION

Figure 1:
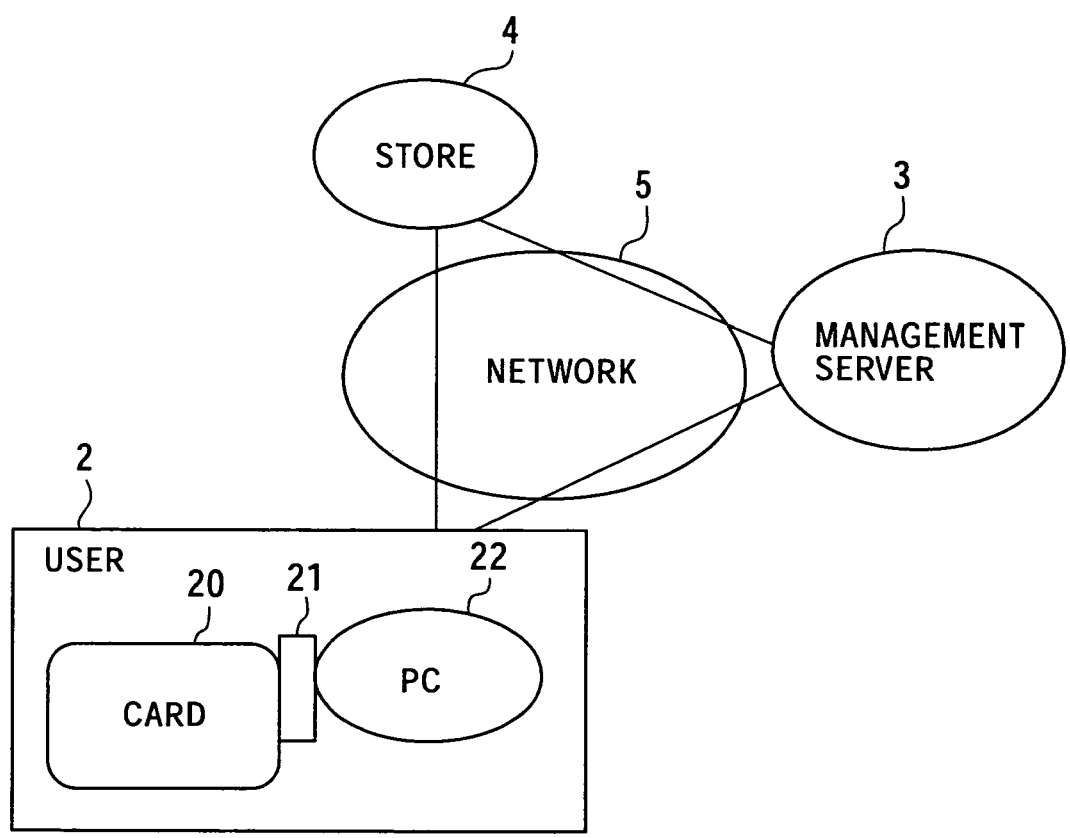
FIG. 1 is a diagram showing the overall system configuration.

With reference to the accompanying drawings, preferred embodiments of a communication system, a card, a management server, and a communication method according to the present invention will be described in detail. In the present specification and drawings, the same reference numerals are given to components that effectively have the same functional configurations, and repeated descriptions of the common portions are omitted.

1. Overall System Configuration

When a commerce transaction with a virtual store (Web mall) on a Web site is conducted using a card, and a payment is settled via a management server that manages the card, a system according to the present embodiment matches a value on the card with a value at the management server. FIG. 1 is a diagram of the overall configuration of the system according to the present embodiment (hereinafter referred to as the present system) 1. The present system 1 establishes communication among a user 2, a management server 3, and a store 4 via a network 5.

(User 2)

The user 2 includes a card 20, a card reader/writer 21 that reads and writes data from and to the card 20, and a personal computer 22 to which the card reader/writer 21 is connected. The user 2 uses the personal computer 22 to access the management server 3 and the store 4, which are the other components of the present system, via the network 5.

Figure 2:
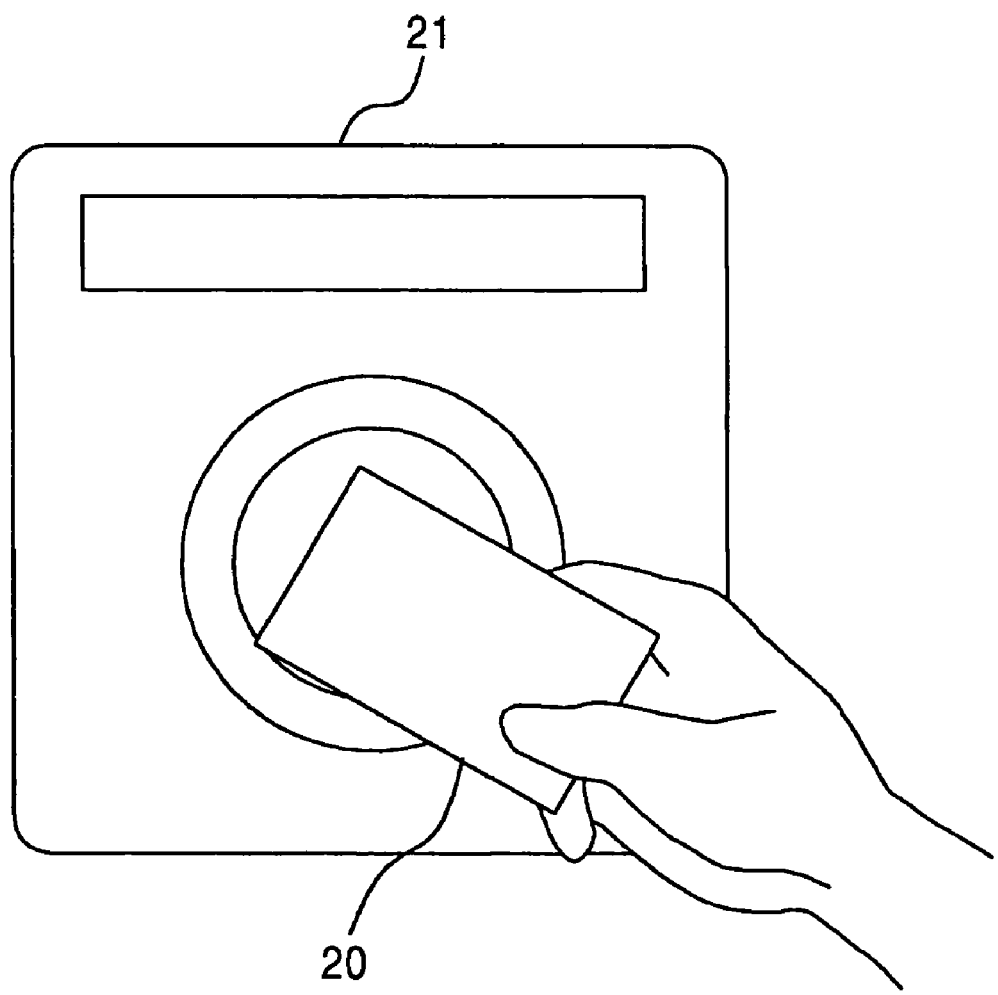
FIG. 2 is an illustration of a state in which a card is held near a card reader/writer.

Contactless data transmission and reception are performed between the card 20 and the card reader/writer 21 using electromagnetic waves. Specifically, as shown in FIG. 2, data is transmitted and received when the card 20 is held near the card reader/writer 21. Cipher communication, such as Triple DES, is performed between the card 20 and the card reader/writer 21. A communication frequency of, for example, 13.56 MHz is used. The card reader/writer 21 transmits a predetermined command to the card 20. The card 20 receives the command and performs processing in response to the command. The card 20 transmits response data in response to the processing result to the card reader/writer 21.

Figure 3:
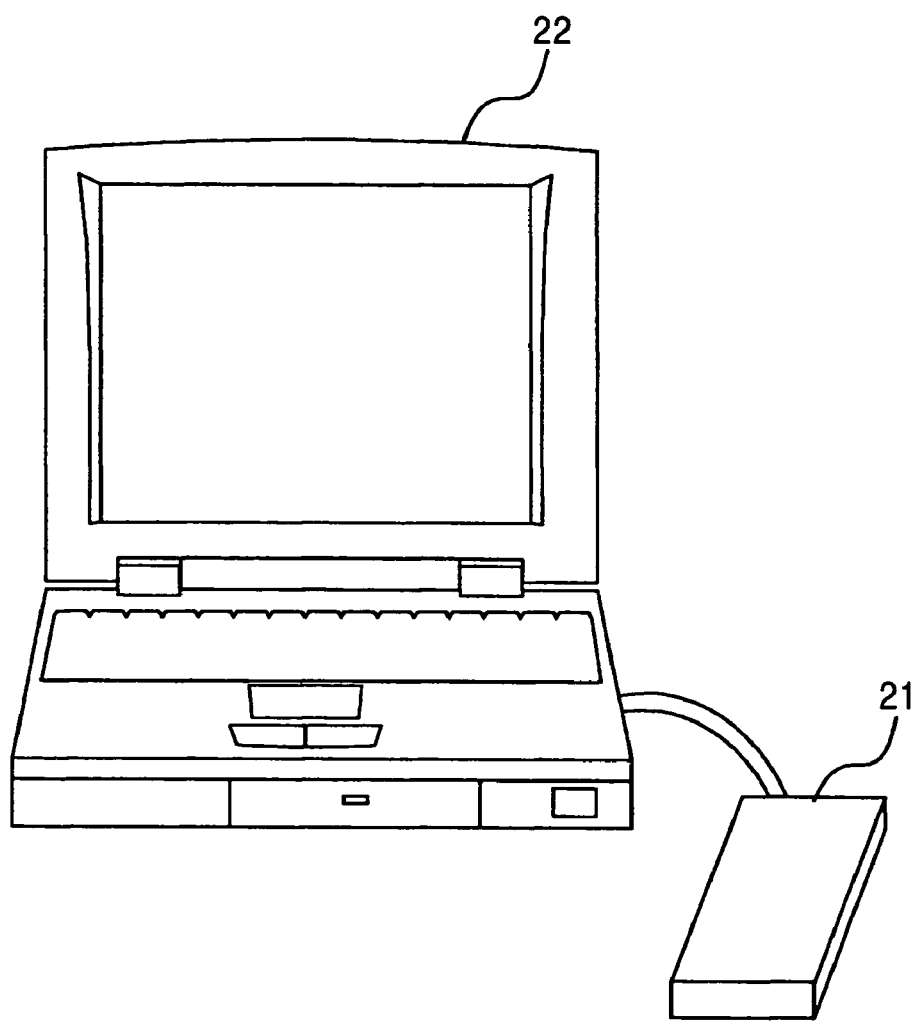
FIG. 3 is an illustration of a state in which the card reader/writer is connected to a personal computer.

As shown in FIG. 3, the card reader/writer 21 is connected to the personal computer 22 via a predetermined interface, such as an interface compliant with the RS485A standard. The personal computer 22 supplies a predetermined signal to the card reader/writer 21 to make the card reader/writer 21 perform predetermined processing.

Figure 4A:
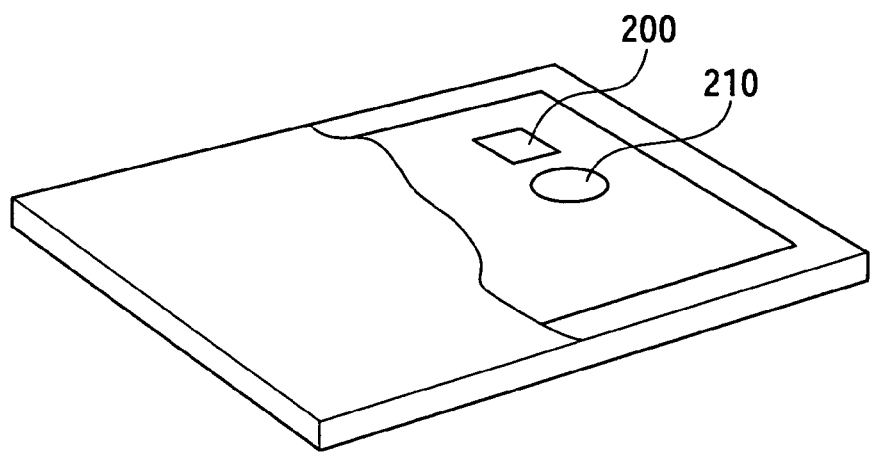
FIG. 4A and FIG. 4B are illustrations of the structure of the card, that is.

The surface of the card 20 is made of PFT (polyethylene terephthalate), which is an environment-friendly material even when burned. As shown in FIG. 4A, an IC module 200 and an antenna (communication means) 210 that communicates with the management server 3 are mounted in the interior of the card 20. The card 20 operates in response to minute electromagnetic waves that are transmitted from the card reader/writer 21 and captured by the antenna 210 and is thus a batteryless card designed to save power and to provide durability.

Figure 4B:
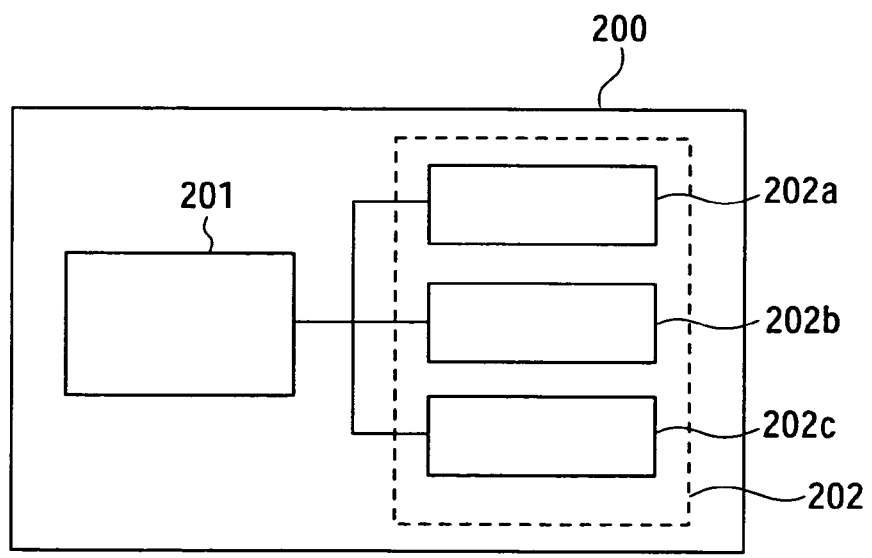

FIG. 4B is a conceptual diagram showing the functional configuration of the IC module 200. As shown in FIG. 4B, the IC module 200 includes a built-in processing circuit 201 and a built-in memory 202 (a first memory portion 202a, a second memory portion 202b, and a third memory portion 202c).

The processing circuit 201 performs various processes in response to predetermined information and requests.

In this embodiment, the processing circuit 201 includes a built-in high-speed CPU. Cipher communication, such as Triple DES, is performed between the card 20 and the card reader/writer 21, thus achieving a security at a level greater than or equal to that achieved by a contact IC card.

The memory 202 is conceptually divided into the first memory portion 202a for storing a value; the second memory portion 202b for maintaining, as a card state flag, the processing state of the card 20 communicating with the management server 3; and the third memory portion 203c for storing a card operating system. The memory 202 includes a rewritable storage medium, such as an EEPROM (Electrically Erasable and Programmable ROM).

Information, such as a value, is written to the memory 202 in predetermined block units. In response to a write request from the management server 3 (described below) for managing the card, information is written up to units of a plurality of blocks, e.g., eight blocks (one block has two bytes). This enables simultaneous writing of a value to the first memory portion 202a and updating of the card state flag in the second memory portion 202b. The same value can be written in a plurality of blocks of the first memory portion 202a. Even if data in some of the blocks becomes corrupted, value information is not lost.

The card state flag stored in the second memory portion 202b is 1-bit data ("0" or "1") indicating whether or not the writing to the card 20 has been completed normally. A process of updating the card state flag will be described later.

The memory 202 is efficiently used by storing the card operating system in the third memory portion 203c. For example, a plurality of access rights for accessing the card 20 is set, or pieces of stored data are managed by individual keys. An application can be safely added afterward to the memory 202.

(Card Reader/Writer 21)

Figure 5:
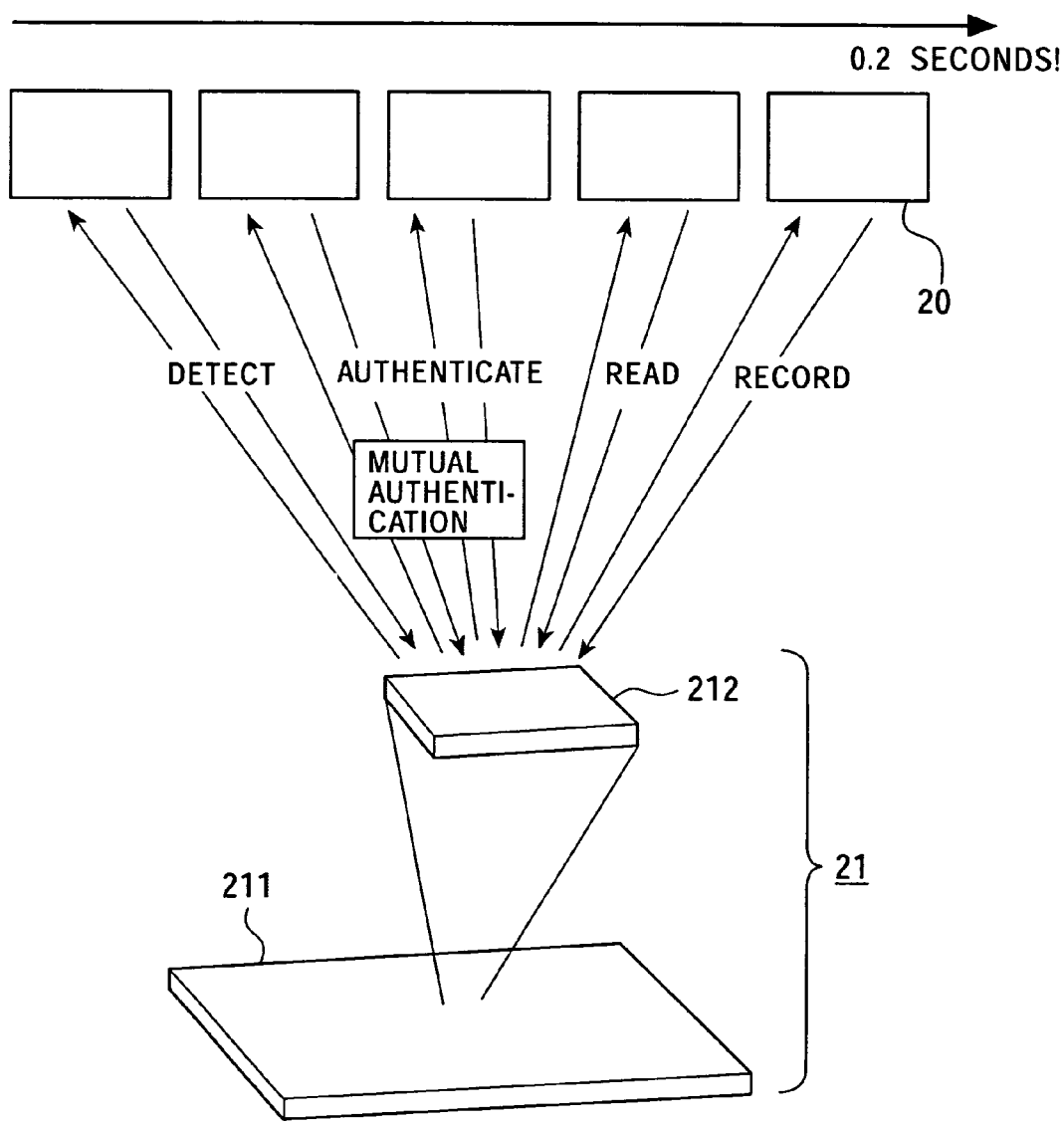
FIG. 5 is a schematic illustration of the configuration of the card reader/writer.

The card reader/writer 21 is connected to the personal computer 22 used by the user 2. The card reader/writer 21 exchanges data with the IC module 200 of the card 20 and with the personal computer 22. As shown in FIG. 5, the card reader/writer 21 includes a pair of a control board 211 and an antenna 212. In response to a command from the management server 3 described below, the card reader/writer 21 communicates with the card 20. Communication between the card reader/writer 21 and the management server 3 is performed using an encrypted signal.

Information exchanged among the IC module 200 of the card 20, the card reader/writer 21, and the personal computer 22 includes values transmitted/received between the card 20 and the management server 3, the card state flag described below, and the like. When reading information from the card 20, the card reader/writer 21 determines the information. When writing to the card, the card reader/writer 21 performs signal processing.

The card reader/writer 21 performs a series of processes involving detecting the card 20, performing mutual authentication between the card 20 and the card reader/writer 21, reading the card 20, and writing to the card 20 in approximately 0.2 seconds. The communication distance between the card 20 and the card reader/writer 21 differs depending on the size of the antenna 212 or the like.

(Personal Computer 22)

The personal computer 22 includes a display, a keyboard, a mouse, and the like. In response to operations of the keyboard or the mouse by the user 2, the personal computer 22 executes various programs. The programs executed by the personal computer 22 include a browser program for browsing Web pages. Using the browser program or the like, the user 2 performs operations on the display to access the store 4 via the network 5 and to conduct a commerce transaction with the store 4.

(Management Server 3)

Figure 6:
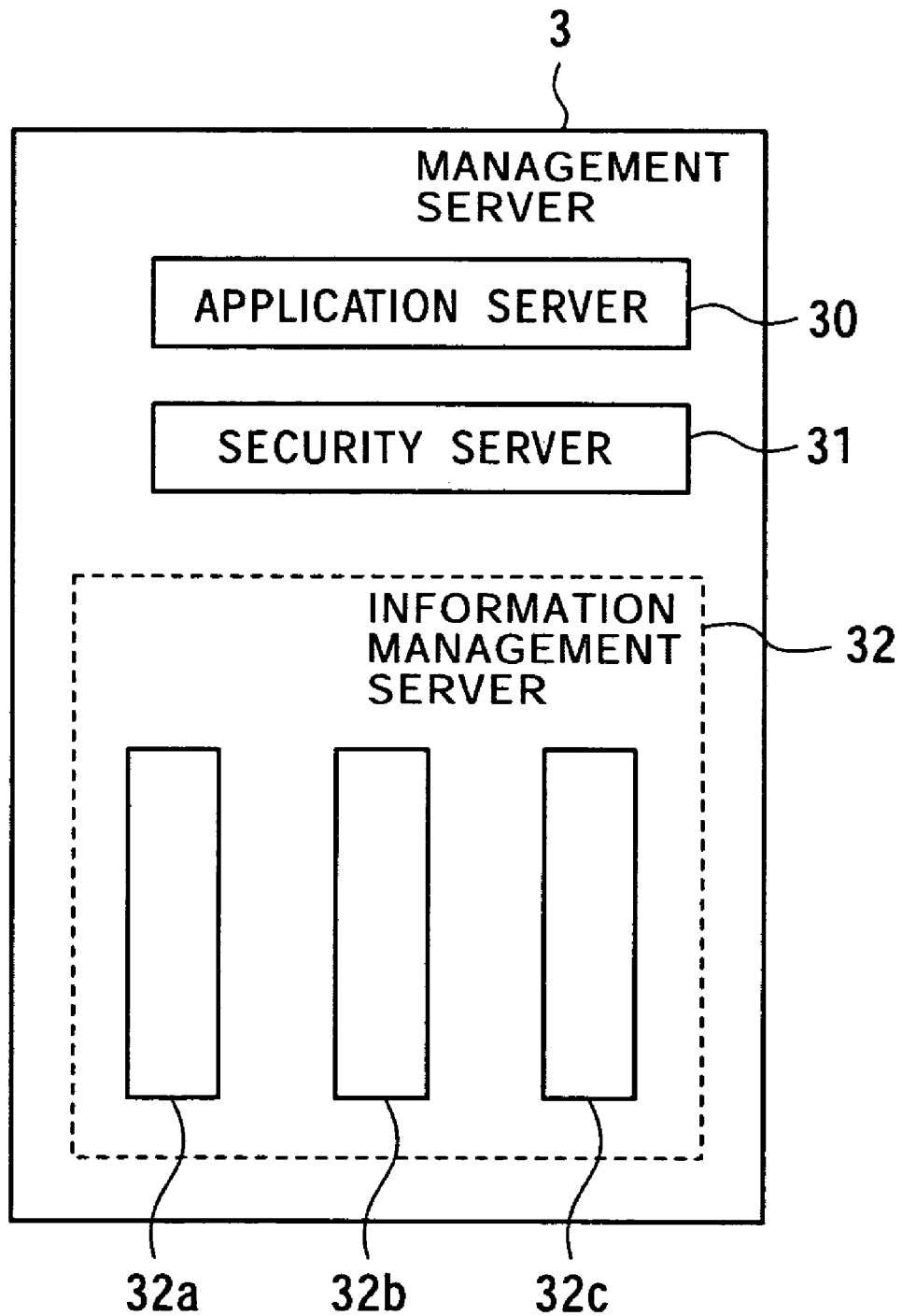
FIG. 6 is a block diagram of the functional configuration of a management server.

As shown in FIG. 6, the management server 3 includes an application server 30, a security server 31, and an information management server 32 (a first memory portion 32a, a second memory portion 32b, and a third memory portion 32c).

The application server 30 is communication means for communicating via the network 5 with the user 2 (personal computer 22) and the store 4 (transaction computer 40). The application server 30 controls the card reader/writer 21 to write information, such as a value, to the card 20 and to determine data on the card 20, the data being read by the card reader/writer 21 and transmitted.

The security server 31 encrypts and decrypts data exchanged with the card 20. The encryption and decryption are not features of the present embodiment, and the existing techniques may be used.

The information management server 32 includes the first memory portion 32a for storing a pair of the registered card 20 and a value on the card 20; the second memory portion 32b for maintaining, as a server state flag, the processing state of the management server 3 during communication with the card 20; and the third memory portion 32c for temporarily storing payment information when the state of the card is determined and the writing to the card has not been completed normally.

The management server 3 according to the present embodiment has the arrangement as described above. A program for causing a computer to execute the functions of the management server 3 may be created, and the program may be recorded on a computer-readable recording medium. Accordingly, the program may be distributed as a corporeal thing.

(Store 4)

The store 4 includes the transaction server 40.

The transaction server 40 stores information concerning products and services offered by the store 4 and generates payment information indicating the amount charged by the store 4 to the user 2. Value writing information is transmitted from the card 20 to the transaction server 40. Value writing results are transmitted from the management server 3 to the transaction server 40.

Figure 7:
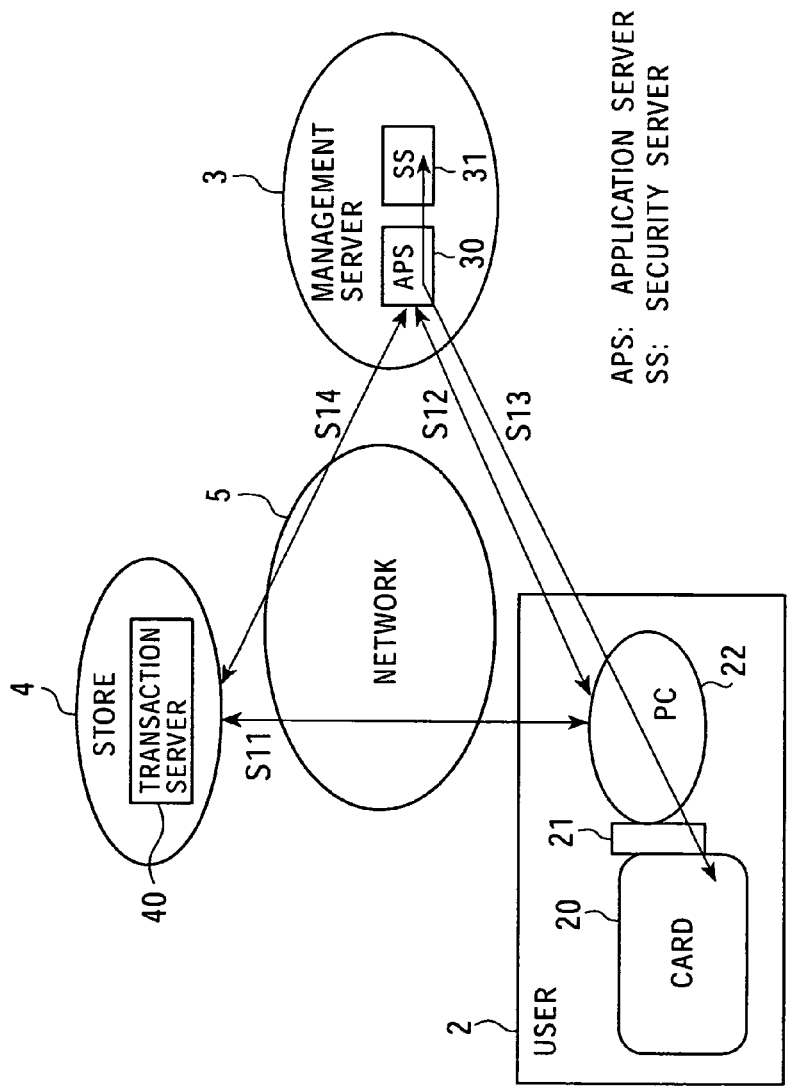
FIG. 7 is a diagram showing the relationship between the card and a card reader.

The present system 1 has the arrangement as described above. With reference to FIG. 7, the operation of the present system 1 will now be described.

(Step S11)

When the user 2 of the card 20 settles a payment at the store 4 on the network 5, the user 2 of the card 20 receives, at the personal computer 22, payment information on the payment settlement from the transaction server 40 of the store 4.

(Step S12)

The user 2 of the card 20 transmits the payment information to the management server 3. The payment information may be transmitted not only from the user 2 to the management server 3, but also from the transaction server 40 of the store 4 to the management server 3.

Alternatively, in step S11, the payment information is transmitted not from the user 2, but from the transaction server 40 of the store 4. In this case, in step S12, the payment information is transmitted from the management server 3 to the card 20.

(Step S13)

The management server 3 updates the value on the card 20, which is in the information management server 32, to the value subsequent to the payment settlement and writes the value subsequent to the payment settlement to the card 20 via the card reader/writer 21 connected to the personal computer 22 of the user 2. Accordingly, value information in the information management server 32 is matched with the actual value.

(Step S14)

The application server 30 of the management server 3 transmits whether the writing of the value to the card 20 has succeeded to the transaction server 40 of the store 4.

With the above-described steps performed, the payment is settled between the user 2 of the card 20 and the store 4.

The present embodiment has a feature in step S13. Specifically, the present embodiment has a feature in the step in which the management server 3 updates the value on the card 20, which is in the information management server 32, to the value subsequent to the payment settlement and writes the value subsequent to the payment settlement to the card 20 via the card reader/writer 21 connected to the personal computer 22 of the user 2. The step will now be described in detail.

2. Method for Controlling Writing to Card

In the card 20 according to the present embodiment, as described above, data (information), such as a value, is written in predetermined block units. A single write request from the management server 3 can designate the writing of data up to plurality of blocks, such as eight blocks (one block has two bytes). Even if the writing of data fails in one block, new and updated data is mixed with old block data, resulting in a mismatch of data. In order to solve this problem, simultaneous writing in plural block units in response to a single write request must be ensured in some way. In the present embodiment, when the writing fails in at least one of the written blocks, data in all the data blocks is restored to the previous state immediately before the writing is performed, and data is rewritten.

Communication between the management server 3, which performs the card writing, and the personal computer 22 used by the user 2 of the card 20 is performed via the Internet, and hence connection establishment is not ensured. The same applies to an environment of the personal computer 22 used by the user 2 of the card 20 and to an Internet-connected environment. The card 20 on which a value is written is contactless and used by being held near the card reader/writer 21. Under these conditions, the necessity arises to have a process sequence that takes into consideration the possibility of interruption of communication between the card 20 and the management server 3 during the writing process.

Figure 8:
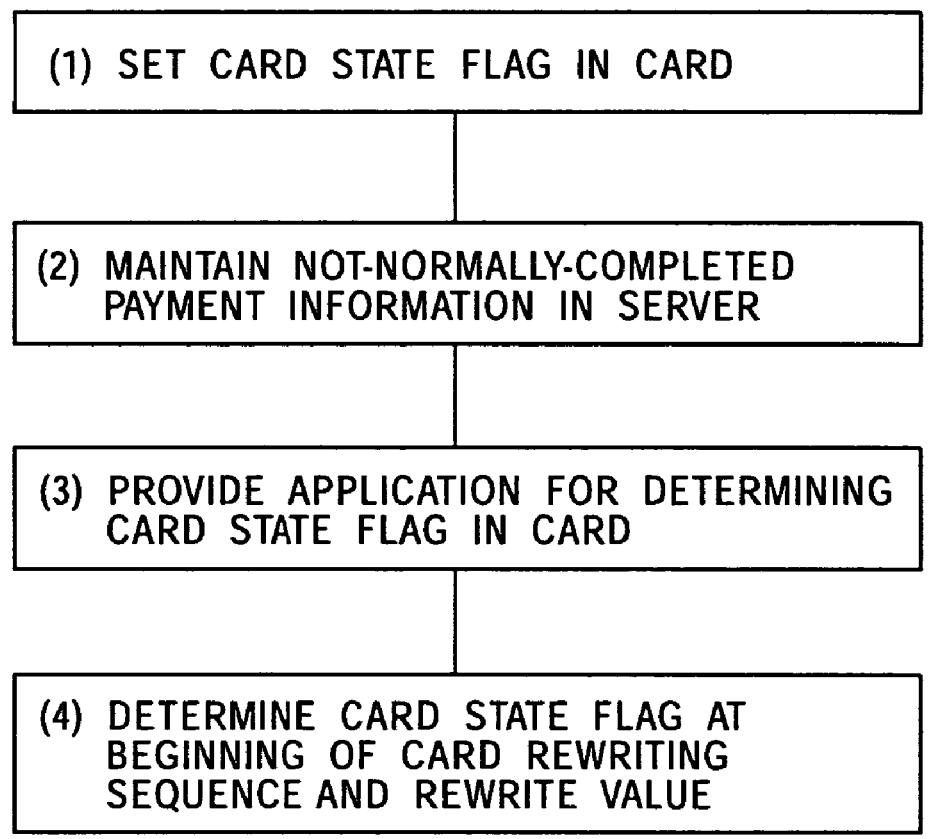
FIG. 8 is an illustration showing the sequence of a process when communication is interrupted.

When communication is interrupted during the writing process, as shown in FIG. 8, a mismatch of values between the card 20 and the management server 3 is solved by steps (1) to (4) described below.

(1) Set a card state flag in the card, which is to be updated at the same time as the card is rewritten.

As described above, this step can be carried out by providing the card 20 with the second memory portion 202b, which maintains, as the card state flag, the processing state of the card 20 during communication with the management server 3.

(2) Create a card rewriting sequence state number in the management server and maintain payment information on a payment settlement that is not completed normally.

As described above, this step can be carried out by providing the third memory portion 32c in the management server 3 and, when the writing to the card is not completed normally, temporarily storing payment information in the third memory portion 32c.

(3) Provide an application that determines the card state flag in the card even when the personal computer 22 used by the user 2 of the card 20 is not connected to the management server 3. The application detects the state of the card 20 on the basis of the card state flag and, if the rewriting to the card 20 is necessary, prompts the user to establish a connection to the management server 3.

The application may be installed in the card 20. Since the card 20 has the third memory portion 203c for storing the card operating system, the application can be safely added afterward. Alternatively, the application may be installed in the personal computer 22 used by the user 2 of the card 20.

(4) Determine the card state flag at the beginning of a card rewriting sequence and rewrite the value.

This step can be carried out by the application provided in step (3).

With the above-described (1) to (4), a mismatch of values between the card 20 and the management server 3 is resolved.

In this embodiment, the card rewriting process is characterized in that it uses different algorithms for value subtraction and value addition. According to this characteristic, even when the writing to a card is interrupted, the card does not have a value that is not supposed to exist. Separate descriptions of a value subtraction process and a value addition process will now be given.

In this embodiment, the processing state of the card 20 communicating with the management server 3 is indicated using the card state flag. The card state flag is 1-bit data ("0" or "1") indicating whether or not the writing to the card 20 is completed normally. When the card 20 requires no rewriting, the card state flag becomes "0". When the card requires rewriting, the card state flag becomes "1". A process of setting such a card state flag will now be described.

(Value Subtraction Process)

When the user 2 of the card 20 conducts a commerce transaction at the store 4, in step S13 shown in FIG. 7, a process of subtracting a value from the card 20 is performed.

Figure 9:
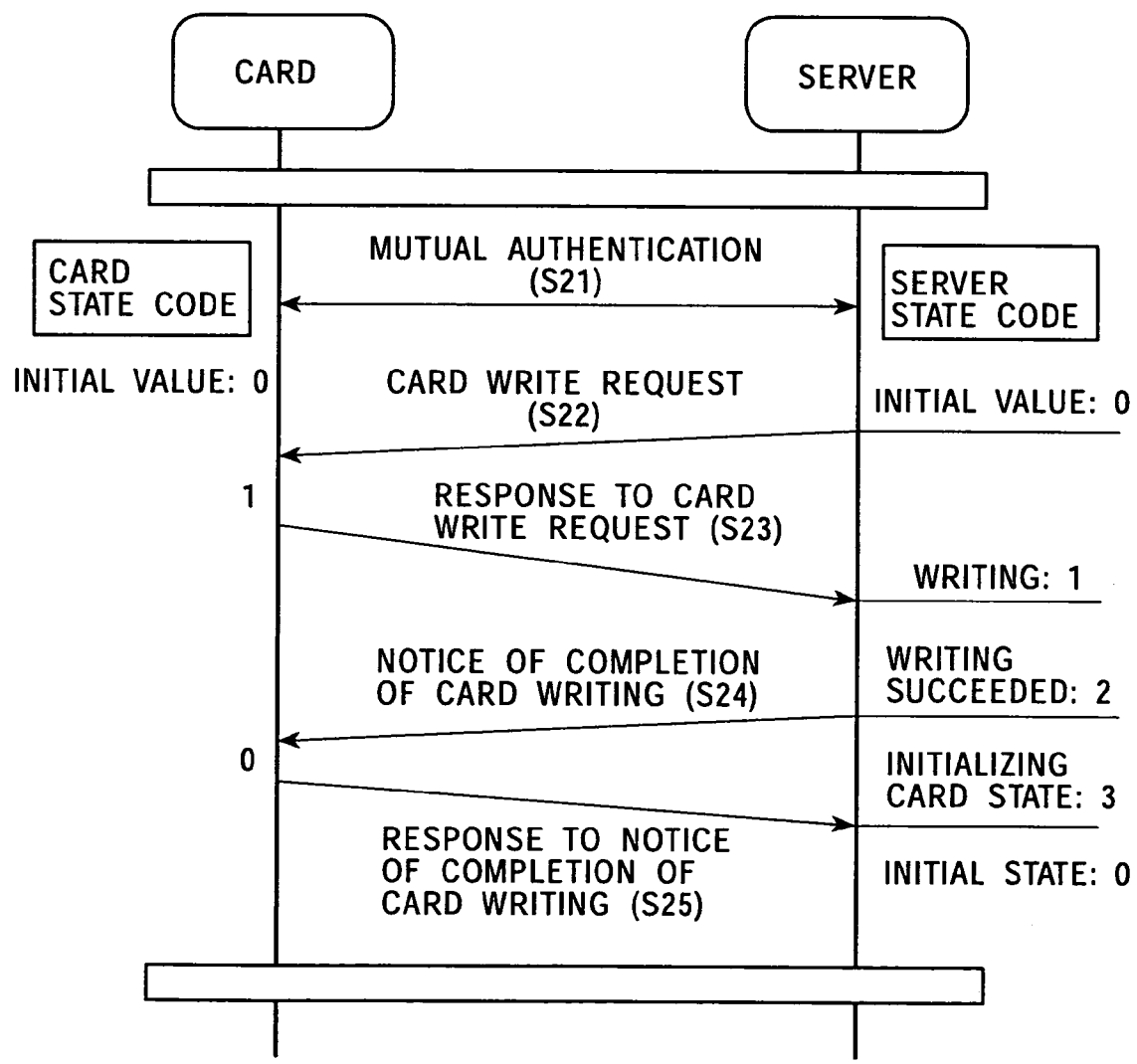
FIG. 9 is a sequence diagram of a value subtraction process.
Figure 10:
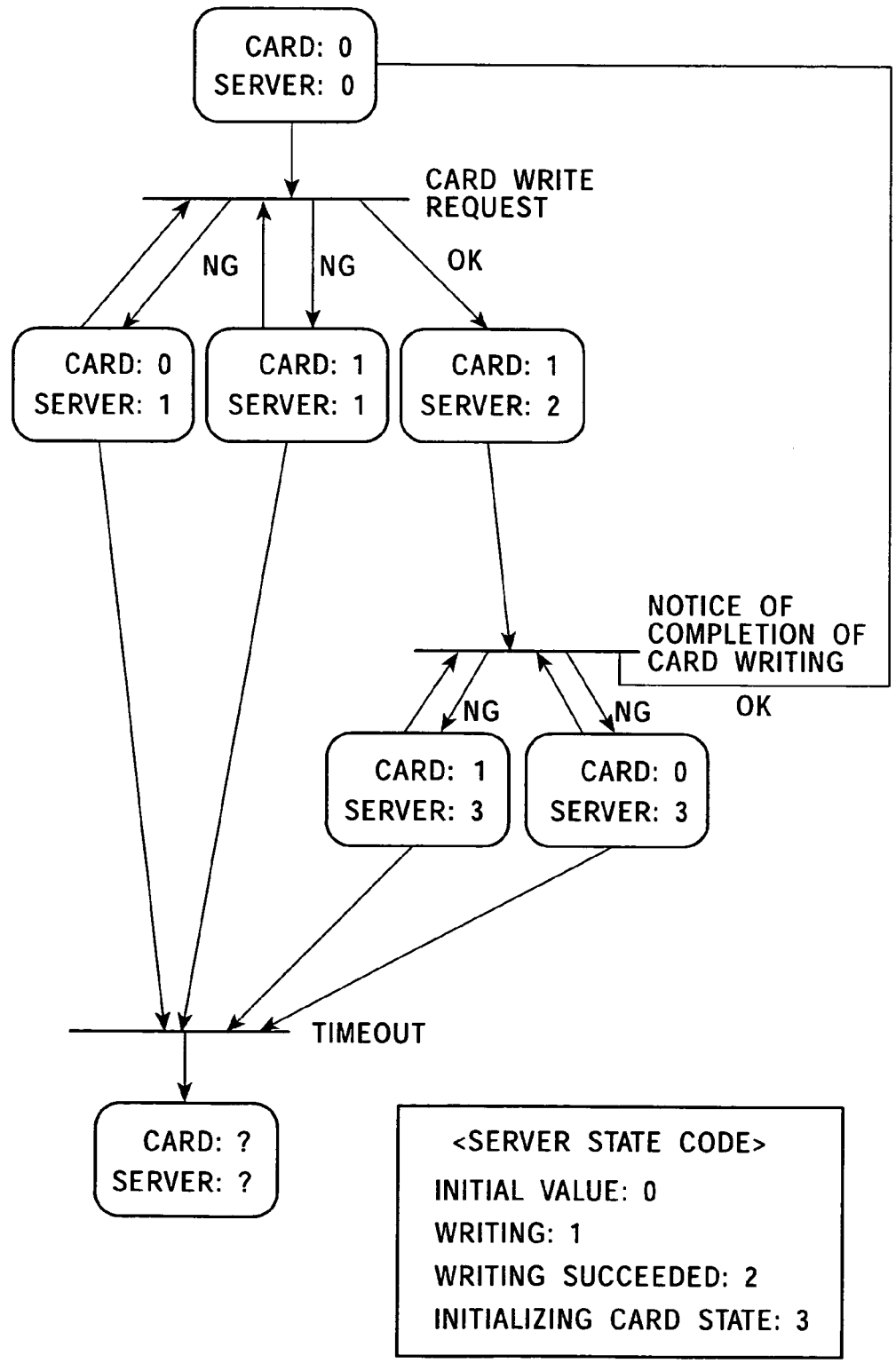
FIG. 10 is a state transition diagram of a card state flag and a server state flag in the value subtraction process.

FIG. 9 is a sequence diagram of a value subtraction process. FIG. 10 is a state transition diagram of the card state flag and the server state flag in the value subtraction process. The description is as follows.

First, the card 20 and the management server 3 perform mutual authentication (step S21). The sequence of the card state flag and the sequence of the server state flag each start with the initial value "0". In the subtraction process, the management server 3 issues a card write request to the card 20 (step S22), and the card writing starts. At this time, the card state flag is changed from "0" to "1", and simultaneously the card 20 gives a response to the card write request to the management server 3 (step S23). During the card writing, the server state flag remains "1" indicating that the writing is being done.

Subsequently, when the card writing is completed normally, the server state flag becomes "2" indicating that the writing is completed. At the same time, the management server 3 gives a notice of completion of the card writing to the card 20 (step S24). In response to the notice of completion of the card writing, the card state flag returns to the initial value "0". At the same time, the card 20 gives a response to the notice of completion of the card writing to the management server 3 (step S25). While the card state is being initialized, the server state flag remains "3" indicating that the card is being initialized.

Subsequently, when the initialization of the card 20 is completed normally, the server state flag returns to the initial value "0".

A case in which the sequence of the subtraction process involving a series of steps is completed normally has been described. With reference to FIG. 11, a rewriting process in a case in which the sequence of the subtraction process is interrupted will now be described. In this embodiment, a card rewriting process that is defined in accordance with the card state flag and the server state flag is performed.

(Card state flag: "0"; and sever state flag: "1")

Since the card writing process is not performed, a payment is not settled. The card rewriting process is not performed.

(Card state flag: "1"; and server state flag: "1")

Since the card writing process is interrupted, a payment is not settled. A payment value is added to the card to restore the previous state before the payment settlement. The card state flag becomes "0".

(Card state flag: "1"; and server state flag: "3")

Although a payment is settled, the sequence is interrupted during the initialization of the card state. Therefore, the card is initialized. In other words, the card state flag becomes "0".

(Card state flag: "0"; and server state flag: "3")

Since a payment is settled and initialization of the card state is completed, the rewriting process is not performed.

When the card state flag and the server state flag and the rewriting process in accordance with the card state flag and the server state flag are set as described above, the following advantages are achieved.

An appropriate card rewriting process in accordance with the card state flag and the server state is performed. When the card state flag is "1", it is determined that the card requires rewriting, irrespective of the value of the server state flag. The user 2 of the card 20 can determine whether or not the card requires rewriting without communicating with the management server 3.

(Value Addition Process)

When the user of the card 20 wants to recharge the card 20 with a value, in step S13 shown in FIG. 7, a process of adding a value to the card 20 is performed.

Figure 12:
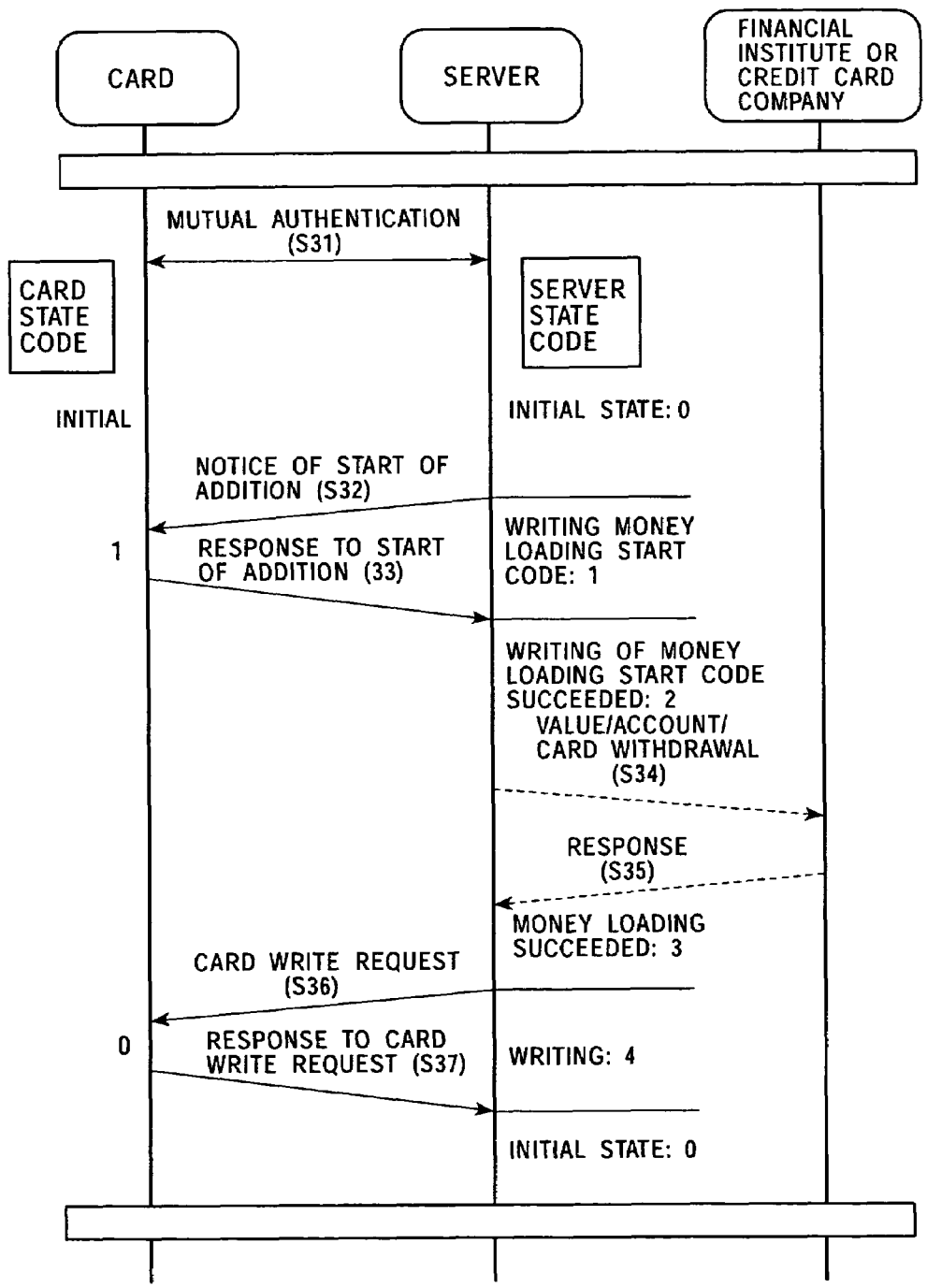
FIG. 12 is a sequence diagram of a value addition process.
Figure 13:
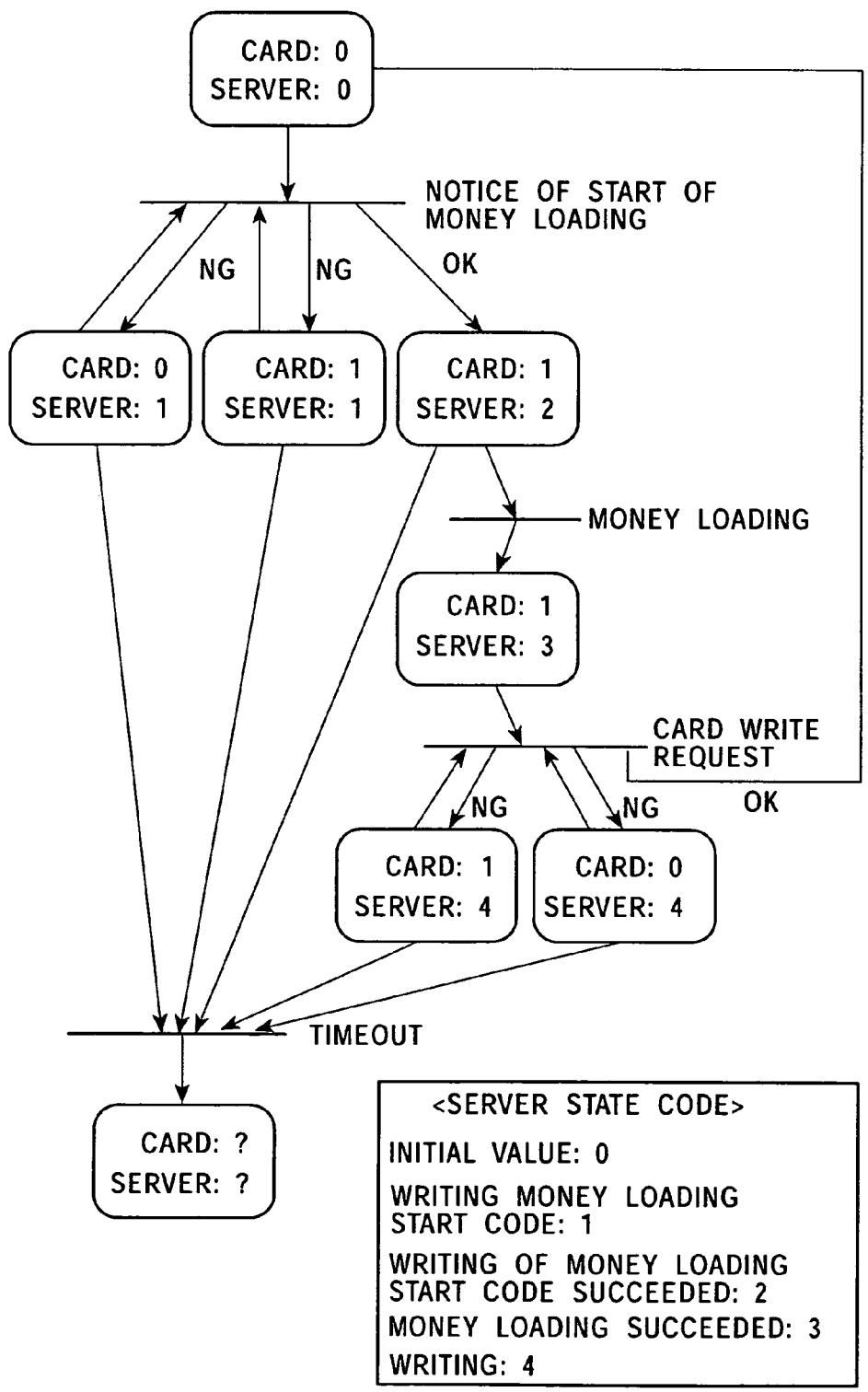
FIG. 13 is a state transition diagram of the card state flag and the server state flag in the value addition process.

FIG. 12 is a sequence diagram of a value addition process. FIG. 13 is a state transition diagram of the card state flag and the server state flag in the value addition process. The description is as follows.

The sequence of the card state flag and the sequence of the server state flag each start with the initial value "0". First, the card 20 and the management server 3 perform mutual authentication (step S31), and the card state flag is updated to "1". The management server 3 gives a notice of start of addition to the card 20 (step S32), and the writing of a money loading start code begins. In response to the notice of start of addition, the card gives a response to the start of addition to the management server 3 (step S33). While the money loading start code is being written, the server state flag remains "1".

Subsequently, when the writing of the money loading start code is completed normally, the server state flag becomes "2" indicating that the writing of the money loading start code is completed. The management server 3 issues a value/account/card withdrawal request to a financial institution or a credit card company 50 (step S34). In response to the request, the financial institution or the credit card company 50 gives a response to the withdrawal request to the management server 3 (step S35).

Subsequently, when the value/account/card withdrawal process is completed normally, the server state flag becomes "3" indicating that the money loading is completed. At the same time, the management server 3 issues a card write request to the card 20 (step S36), and the card writing starts.

At this time, the card state flag changes from "1" to "0". At the same time, the card 20 gives a response to the card write request to the management server 3 (step S37). During the card writing, the server state flag remains "4" indicating that the card is being written.

Subsequently, when the card writing is completed normally, the server state flag returns to the initial value "0".

The process of adding a value to the card differs from the subtraction process sequence in that it has a different order of changing the card state flag. As a result, when the need to rewrite the card arises, the rewriting process always serves as the value addition process. Even when there is a service, other than the value addition and subtraction services via the network, for changing the card value, irrespective of the state at the server side, a value that is not supposed to exist is prevented from being used.

A case in which the sequence of the addition process involving a series of steps is completed normally has been described. With reference to FIG. 14, a rewriting process in a case in which the sequence of the addition process is interrupted will now be described. In this embodiment, a card rewriting process that is defined in accordance with the card state flag and the server state flag is performed.

(Card state flag: "0"; and server state flag: "1")

Since the card writing process is not performed, a withdrawal is not made. The card rewriting process is not performed.

(Card state flag: "1"; and server state flag: "1")

Since the sequence is interrupted during the card writing, a withdrawal is not made. The card state flag becomes "0".

(Card state flag: "1"; and server state flag: "2")

Since the sequence is interrupted during the card writing, a withdrawal is not made. The card state flag becomes "0".

(Card state flag: "1"; and server state flag: "3")

Although the withdrawal process is completed, the process is not reflected in the card. The withdrawn value is thus added to the card. The card state flag becomes "0".

(Card state flag: "1"; and server state flag: "4")

Although the withdrawal process is completed, the process is not reflected in the card. The withdrawn value is thus added to the card. The card state flag becomes "0".

(Card state flag: "0"; and server state flag: "4")

Since the withdrawal process is carried out and initialization of the card state is completed, the rewriting process is not performed.

When the card state flag and the server state flag and the rewriting process in accordance with the card state flag and the server state flag are set as described above, the following advantages are achieved.

An appropriate card rewriting process in accordance with the card state flag and the server state is performed. When the card state flag is "1", it is determined that the card requires rewriting, irrespective of the value of the server state flag. The user 2 of the card 20 can determine whether or not the card requires rewriting without communicating with the management server 3.

As described above, according to the communication system, the card, the management server, and the communication method of the embodiments, the card creates the card state flag indicating the card's processing state and occasionally updates the card state flag while communicating with the management server. Accordingly, determination of the card state flag enables determination of whether or not the writing by the management server to the card is completed normally. Since it is possible to determine whether or not the card writing process is completed normally only on the basis of the card state flag, there is no need to communicate with the management server to detect the processing results.

At the same time, the management server creates the server state flag indicating the management server's processing state and occasionally updates the server state flag while communicating with the card. Such simultaneous processing by the card and the management server resolves a mismatch of values between the card and the management server. Therefore, a payment can be easily settled via the network using the card.

With reference to the accompanying drawings, the preferred embodiments of the communication system, the card, the management server, and the communication method according to the present invention have been described. However, the present invention is not limited to these examples. It is clear that modifications and substitutions can be made by those skilled in the art without departing from the technical scope of the present invention, which is described in the claims. It is to be understood that such modifications and substations are within the technical scope of the present invention.

In the above-described embodiments, a case has been described in which a commerce transaction with a virtual store (Web mall) on a Web site is conducted using a card, and a payment is settled via a management server that manages the card. However, the present invention is not limited to this case. The present invention is applicable to a case in which a user of a card conducts an offline commerce transaction and uses the card to make a payment for the commerce transaction. In this case, the card reader/writer acting as an intermediary for communication between the management server and the card is provided at the store. A computer installed at the store can establish a connection to the management server via the network.

As described above, according to the present invention, the following advantages are achieved:

(1) The card writing via the network is made possible;
(2) A system that is logically free from a mismatch of values between the card and the server can be constructed; and
(3) The card writing via the network and the card writing that is not via the network are made possible with respect to the same card.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A communication method for enabling communication between a card and a management server that manages the card and for writing information transmitted from the management server to the card, comprising the steps of:

the card creating a card state flag indicating the processing state of the card and occasionally updating the card state flag while communicating with the management server, the management server creating a server state flag indicating the processing state of the management server and occasionally updating the server state flag while communicating with the card, and on the basis of the card state flag, the card determining whether or not the writing by the management server to the card is completed normally; and, when it is determined that the writing is not completed normally, requesting the management server to rewrite the card the next time communication is established between the card and the management server, the rewriting being defined in accordance with the card state flag and the server state flag.

2. The communication method according to claim 1, wherein the information is written in predetermined block units in a storage region in the card in which the information is written; and a single write request from the management server enables the writing of the information in a plurality of said block units.

3. The communication method according to claim 1, wherein the information includes information concerning a monetary value for making a payment for a product or a service using the card.

4. The communication method according to claim 1, wherein the card state flag is 1-bit data indicating whether or not the writing to the card is completed normally.

5. The communication method according to claim 1, wherein the card is an IC card.

6. A communication method for enabling communication between a card and a management server that manages the card and for writing information transmitted from the management server to the card, said method comprising the steps of:

the card creating a card state flag indicating the processing state of the card and occasionally updating the card state flag while communicating with the management server, the management server creating a server state flag indicating the processing state of the management server and occasionally updating the server state flag while communicating with the card, and on the basis of the card state flag, the management server determining whether or not the writing by the management server to the card is completed normally; and, when it is determined that the writing is not completed normally, rewriting the card the next time communication is established between the card and the management server, the rewriting being defined in accordance with the card state flag and the server state flag.

7. The communication method according to claim 6, wherein the information is written in predetermined block units in a storage region in the card in which the information is written; and a single write request from the management server enables the writing of the information in a plurality of said block units.

8. The communication method according to claim 6, wherein the information includes information concerning a monetary value for making a payment for a product or a service using the card.

9. The communication method according to claim 6, wherein the card state flag is 1-bit data indicating whether or not the writing to the card is completed normally.

10. The communication method according to claim 6, wherein the card is an IC card.

11. A management server for managing a card and for transmitting information to the card, comprising:

communication means for communicating with the card;

first storage means for storing the content of the information stored on the card;

second storage means for maintaining the processing state as a server state flag; and third storage means for temporarily storing the information when the state of the card is determined and it is thus determined that the writing of the information is not completed normally, wherein the server state flag in the second storage means is occasionally updated while the information is being transmitted to the card.

12. The management server according to claim 11, wherein, when the writing of the information is not completed normally, the information stored in the third storage means is retransmitted to the card.

13. The management server according to claim 11, wherein, when the writing of the information is not completed normally, in response to a request from the card, the information stored in the third storage means is retransmitted to the card.

14. The management server according to claim 11, wherein the information includes information concerning a monetary value for making a payment for a product or a service using the card.

15. A communication method for enabling communication between a card and a management server that manages the card and for writing information transmitted from the management server to the card, comprising:

creating the processing state of the management server and the processing state of the card as a server state flag and a card state flag, respectively;

occasionally updating the server state flag and the card state flag while communication is performed between the card and the management server;

determining, on the basis of the card state flag, whether or not the writing by the management server to the card is completed normally; and when it is determined that the writing is not completed normally, rewriting the card the next time communication is established between the card and the management server, the rewriting being defined in accordance with the card state flag and the server state flag.

16. The communication method according to claim 15, wherein the card state flag is 1-bit data indicating whether or not the writing to the card is completed normally.

17. A computer readable recording medium having recorded thereon a program enabling communication between a card and a management server that manages the card and for writing information transmitted from the management server to the card, program comprising the steps of:

creating the processing state of the management server and the processing state of the card as a server state flag and a card state flag, respectively;

occasionally updating the server state flag and the card state flag while communication is performed between the card and the management server;

determining, on the basis of the card state flag, whether or not the writing by the management server to the card is completed normally; and when it is determined that the writing is not completed normally, rewriting the card the next time communication is established between the card and the management server, the rewriting being defined in accordance with the card state flag and the server state flag.

* * * * *